Oct. 19, 1948.                    G. GUANELLA                    2,451,822
                        DISTANCE AND SPEED INDICATING SYSTEM
Filed Feb. 15, 1945                                              3 Sheets-Sheet 1
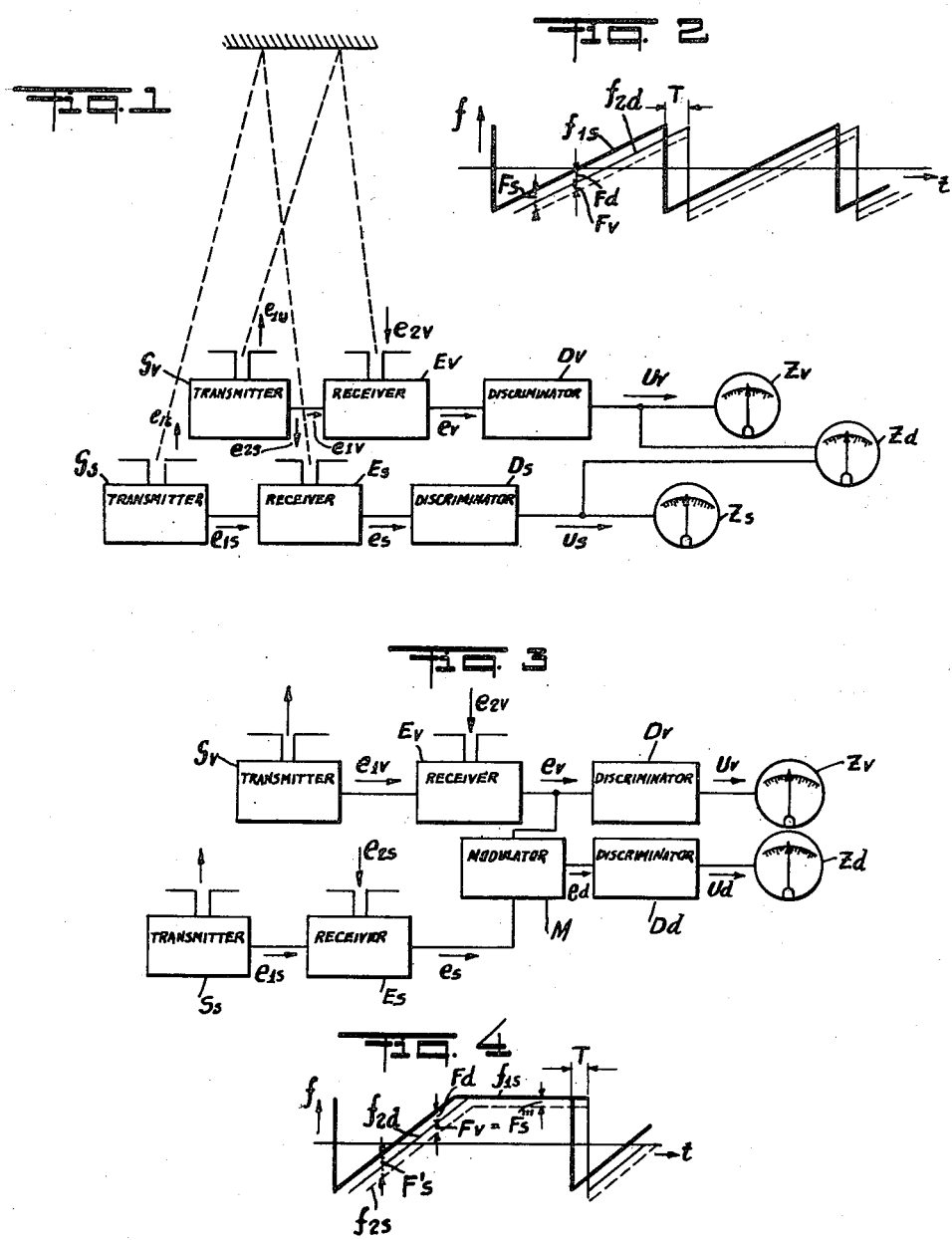
INVENTOR.
Gustav Guanella
BY
ATTORNEY

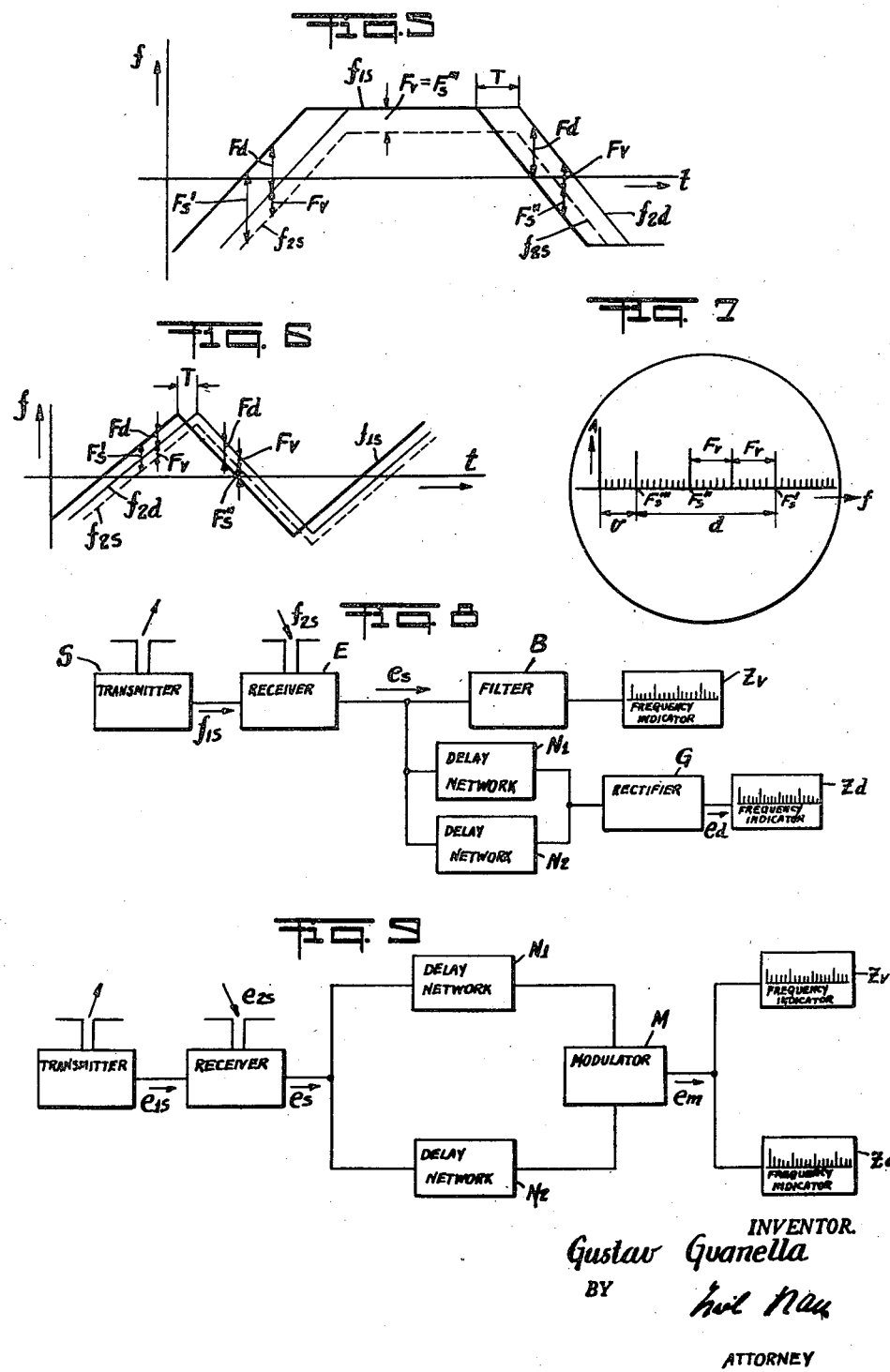

Oct. 19, 1948.  G. GUANELLA  2,451,822
DISTANCE AND SPEED INDICATING SYSTEM
Filed Feb. 15, 1945  3 Sheets-Sheet 3
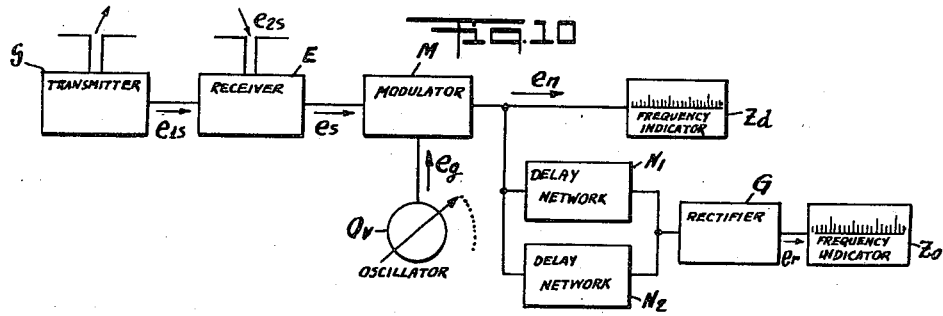
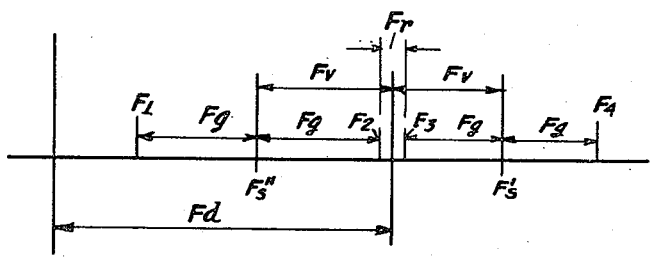
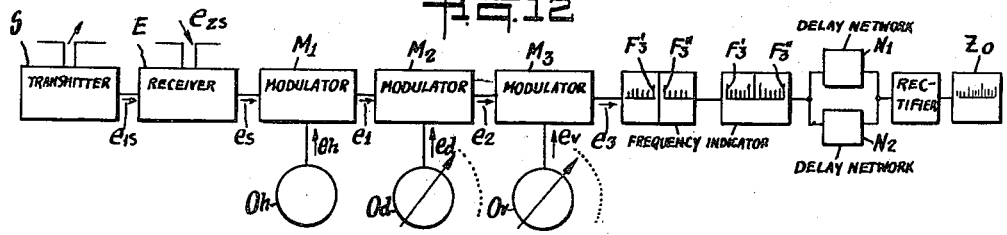
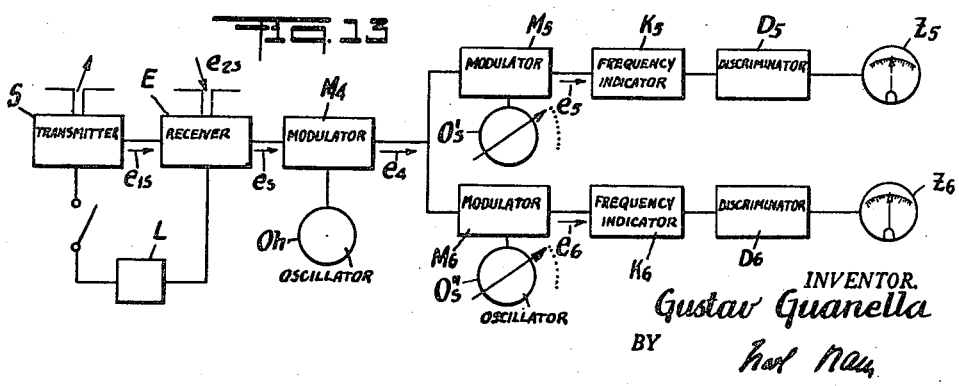
INVENTOR.
Gustav Guanella
BY
ATTORNEY Patented Oct. 19, 1948

2,451,822

UNITED STATES PATENT OFFICE 2,451,822

DISTANCE AND SPEED INDICATING SYSTEM

Gustav Guanella, Zurich, Switzerland, assignor to Radio Patents Corporation, New York, N. Y., a corporation of New York Application February 15, 1945, Serial No. 578,013
In Switzerland October 27, 1943

Section 1, Public Law 690, August 8, 1946
Patent expires October 27, 1963

12 Claims. (Cl. 343—12)

Methods of determining distance by acoustic or electromagnetic oscillations according to the reflection principle are known, wherein the frequency is varied periodically and a beat is formed between the radiated oscillation and the oscillation reflected from the body whose distance is to be determined which beat has a frequency proportional to the distance. A disadvantage of these methods is the fact that a relative movement of said body with reference to the transmitting-receiving point results in an increase or reduction of the received frequency due to the so-called Doppler effect which causes the beat frequency at the reception point to vary. As a consequence of this, there will be an error in the distance determined from the beat frequency. A further disadvantage of these methods is the fact that the velocity of the reflecting body which is important in many cases cannot be determined directly from this measurement.

In order to avoid these disadvantages, the present invention proposes a method of simultaneously determining distance and velocity by means of radiant wave energy, wherein the electrical oscillations of a transmitter are transmitted to at least one receiver, said oscillations being partly transmitted directly from the transmitter and partly by way of the reflecting object. The invention is furthermore characterised by a modulation of the transmitted energy in such a manner that beat frequencies are formed by superimposing the reflected and the directly transmitted oscillations, the desired relative velocity and distance being derived from those parts of these beat frequencies which are dependent on the velocity and distance respectively.

A particular advantage of the invention is the fact that distance and relative velocity are determined continuously and that the operation of a device for carrying out this new method is very simple.

The invention will become more apparent from the following detailed description taken in reference to the accompanying drawings forming part of this specification, and wherein:

Figure 1 is a block diagram illustrating one form of a distance and/or speed indicating system embodying the principles of the invention;

Figure 2 shows a suitable wave shape for varying the transmitting frequency in the system according to Figure 1;

Figure 3 is a block diagram showing a modification of Figure 1;

Figures 4, 5 and 6 illustrate wave shapes for varying the transmitting frequency for use in improved distance and/or speed measuring systems according to the invention;

Figure 7 illustrates a frequency indicating scale suitable for use in connection with the invention;

Figures 8 and 9 are block diagrams illustrating further modifications of the invention;

Figure 10 is a block diagram illustrating another modified system and method of practicing the invention;

Figure 11 shows a frequency indicating scale explanatory of the function of Figure 10; and Figures 12 and 13 are block diagrams showing still other modifications of the invention.

Like reference characters identify like parts throughout the different views of the drawings.

Referring to Fig. 1, there is shown an embodiment utilizing two separate transmitter-receiver installations. The transmitting frequency of the first installation consisting of a transmitter $S_v$ and a receiver $E_v$ is constant, so that oscillation $e_{1v}$ transmitted directly from $S_v$ to $E_v$ and oscillation $e_{2v}$ transmitted over the reflection point produce a beat frequency $F_v$ in receiver $E_v$ which according to the Doppler effect is proportional to the relative velocity $v$ of the reflecting object, i. e., $$F_v = K_v \cdot v \qquad (1)$$

By filtering and rectifying in discriminator $D_v$ a voltage $u_v$ is obtained which is proportional to the beat frequency and thus also the velocity, i. e., $$u_v = k_v \cdot v \qquad (2)$$

Indicating instrument $z_v$, if suitably calibrated, then indicates the desired relative velocity $v$.

The transmitting frequency $f_{1s}$ of a second transmitter $S_s$ is, as shown in Figure 2, wobbled according to a saw-tooth curve. The receiving voltage $e_{2s}$ reaching the second receiver $E_s$ is retarded by a time $T$ proportional to the distance $d$ when compared with $e_{1s}$, i. e., $$T = \frac{2 \cdot d}{c} \qquad (3)$$

Accordingly, with a constant distance $d$ there is a frequency $F_d$ proportional to the distance between the directly and indirectly received frequencies $f_{1s}$ and $f_{2d}$, i. e., $$F_d = K_d \cdot d \qquad (4)$$

The discriminator $D_s$ serves to produce from the receiving voltage resulting from rectification in $E_s$, a control voltage $u_s$ which is proportional to the frequency and which, if the distance $d$ is constant, is directly proportional to this distance, i. e., $$u_s = k_d \cdot d \quad (5)$$

Indicating instrument $Z_s$, if suitably calibrated, and with the point of reflection being stationary, thus shows the distance directly.

If distance $d$ from the reflection point increases, the receiving frequency will be reduced by the amount $F_v$ due to the Doppler effect, so that a beat frequency $F_s$ occurs which is composed of the frequency portion $F_v$ which is proportional to the velocity and the frequency part $F_d$ which is proportional to the distance, i. e., $$F_s = F_d \pm F_v \quad (6)$$

The positive sign of $F_v$ applies to an increasing distance and the negative sign to a decreasing distance. The discriminator output voltage $u_s$ is accordingly also composed of a velocity-proportional part $u_v$ and a distance-proportional part $u_d$, i. e., $$u_s = u_d \pm u_v \quad (7)$$

whereby the positive sign again applies to an increasing distance and the negative sign applies to a decreasing distance.

Distance $d$ in accordance with the invention is now measured by an instrument $Z_d$, which with a decreasing distance measures the difference $$u_s - u_v = u_d$$

and with an increasing distance the sum $$u_s + u_v = u_d$$

With the arrangement shown in Figure 3 which again embodies two transmitters and two receivers $S_v$, $S_s$ and $E_v$, $E_s$ respectively, the sum and difference frequency of the voltages $e_v$ and $e_s$ is formed in the modulator M. With a frequency variation for the transmitter $S_s$ of the kind shown in Figure 2, the resulting difference or sum of the beat frequencies $F_s$ and $F_v$ according to Equation 6, produces the required frequency $F_d$ proportional to the distance. By means of discriminator $D_d$ a direct voltage $u_d$ proportional to the distance is obtained, this voltage being measured by the distance indicator $Z_d$.

There is practically no mutual interference of the reception of the transmission of $S_v$ by $E_s$ and of the reception of $S_s$ by $E_v$, because the beats occurring in the receivers between both transmission frequencies after rectification generally have a very high frequency and can if necessary be suppressed by low-pass filters. If the transmission frequency of $S_v$ for instance coincides with the average transmission frequency of $S_s$ then the difference of both frequencies is only for a very short time within the frequency range of the beat which occurs due to the direct or indirect transmission of one of the transmission frequencies. If necessary the fixed transmission frequency $f_{1v}$ can also be located beyond the range of the variable transmission frequency $f_{1s}$.

The separation of the beat proportional to the distance from that proportional to the velocity can also be achieved with apparatus employing only one transmitter and receiver. In such a case the transmission frequency may be varied in accordance with a wave shape such as shown in Figures 4, 5 or 6. With a wave shape such as shown in Figure 4, the transmission frequency $f_{1s}$ is alternately constant and linearly variable. A stationary reflection point would then result in a reception frequency $f_{2d}$, which alternately differs from $f_{1s}$ by the beat frequency $F_d$ and zero beat frequency. If the distance to the reflection point increases, the reception frequency will be further decreased by the amount $F_v$ due to the Doppler effect so that the resultant reception frequency $f_{2s}$ indicated by a broken line together with the transmission frequency produces the beats $F'_s$ and $F'''_s$, respectively, which alternately coincide with $(F_d + F_v)$ and $F_v$. If the distance $d$ decreases, the actual beat $F_s$ alternately corresponds to the difference $(F_d - F_v)$ on the one hand and $F_v$ on the other hand. These beat frequencies which occur alternately one after the other are measured separately so that, with a corresponding calibration of the instrument, deflections $v$ and $(d+v)$ with an increasing distance and deflections $v$ and $(d-v)$ with a decreasing distance will be obtained. Both frequency indicating pointers are preferably arranged one above the other so that the deflection of one of the pointers directly indicates the velocity and the difference of the deflections between both pointers indicates the distance to be determined as will be described furthermore in the following.

For the indication of the frequencies in an arrangement afore-described it is advisable to use a frequency spectrograph for measuring the frequency, this spectrograph for instance being a vibrating reed-type frequency meter having a large number of unequally tuned reeds or an electrical frequency spectrograph having a large number of unequally tuned resonance circuits with associated rectifiers and cathode ray indicator. With a wobbling wave shape for the transmitting frequency according to Figure 5, comprising alternate and successive periods of linearly increasing, constant and linearly decreasing frequency as shown, such a frequency spectrograph produces three deflections which correspond to the alternating and successively occurring reception beat frequencies $F'_s$, $F''_s$, and $F'''_s$. From Figure 5 it can be seen that these beat frequencies are alternately composed of the following values:

$$F'_s = F_d + F_v$$
$$F''_s = F_d - F_v \quad (8)$$
$$F'''_s = F_v$$

The velocity $v$ can be obtained directly from the reading $F'''_s$, while the difference between the indicated readings $F'_s$ and $F'''_s$ will enable the distance $d$ to be read directly.

This is further illustrated in Figure 7 which shows the scale of a frequency indicator, the abscissa $f$ indicating the frequency and the ordinate $A$ corresponding to the deflection of the calibrated reeds or other indicating means in a manner well understood by those skilled in the art. In case of a multiple frequency indication as obtained by the invention, the wobbling frequency of the signal as shown in Figures 4-6 will be many times higher than the signal frequency, whereby to enable a continuous indication of the frequencies $F'_s$ and $F''_s$ due to the inertia of the indicating elements. In case of a cathode ray spectrograph, simultaneous indication of more than one frequency will be enabled due to the persistence of vision of the human eye being substantially greater than the wobbling periods used for distance measurements in arrangements of the type described hereinabove.

Another method of measuring the beat frequency for a transmitting frequency variation according to Figures 4 or 5 is illustrated in Figure 8. By means of a correspondingly adjusted variable band pass filter B the beat frequency $F'''_s$ is extracted from the rectified reception voltage $e_s$ and applied to the first frequency indicator $Z_v$ which provides a direct reading of the velocity. The successively occurring beat frequencies $F'_s$ and $F'''_s$ are retarded by unequal amounts of time by means of the networks or retardation devices $N_1$ and $N_2$ so that they occur simultaneously at the output of these networks. By rectification in the rectifier $G_a$ the voltage $e_d$ is obtained therefor whose frequency coincides with the frequency difference $(F'_s - F'''_s) = F_d$. Distance $d$ can thus be read directly on the frequency meter $Z_d$.

Another method of measuring the beat which can be applied with advantage to a transmitting frequency variation as shown in Figure 6, is illustrated in Figure 9. The frequency $F_s$ of the rectified reception voltage $e_s$ in this case varies between the values $$F'_s = (F_d + F_v)$$

and $$F''_s = (F_d - F_v)$$

By means of networks or retardation devices $N_1$ and $N_2$ these alternately and successively occurring voltages are retarded by unequal amounts, so that they always occur simultaneously at the outputs of the networks. By forming the modulation product in modulator $M$ a modulation voltage $e_m$ is produced which is composed of the sum and difference frequencies. As is readily seen from Figure 6

$$F'_s + F''_s = 2F_d$$
$$F'_s - F''_s = 2F_v \quad (9)$$

The sum frequencies are thus proportional to the distance $d$ and the difference frequencies to the velocity $v$. These sum and difference frequencies are measured separately by the frequency indicators $Z_d$ and $Z_v$. When these instruments are suitably calibrated a direct reading of the velocity and distance is obtained.

An arrangement which may also be applied to transmitting frequency variations according to Figure 6 is shown in Figure 10 and illustrated furthermore in Figure 11. The rectified reception oscillation $e_s$ is again composed of the alternately and successively occurring beat frequencies $F'_s$ and $F''_s$. An auxiliary oscillation $e_g$ is produced in an oscillator $O_v$. In the modulator $M$, $e_s$ and $e_g$ produce the modulation product $e_n$ which according to Figure 11 consists of the sum and difference frequencies $F_4$ and $F_3$ $(F'_s \pm F_g)$ and $F_2$ and $F_1$ $(F''_s \pm F_g)$. By means of the networks $N_1$ and $N_2$, the voltages are again retarded by unequal amounts of time, so that the sum frequency $F_2 = (F''_s + F_g)$ and the difference frequency $F_3 = F'_s - F_g$ occur simultaneously. Due to rectification in the rectifier $G$, the new difference frequency $F_r$ is produced, this frequency being indicated by the instrument $Z_0$. By means of a corresponding adjustment of $O_v$ this frequency is reduced to zero. Frequencies $F_2$ and $F_3$ in Figure 11 then coincide. In this case the auxiliary frequency $F_g$ is equal to the velocity-proportional frequency $F_v$, since according to Figure 6

$$(F'_s - F''_s) = 2F_v$$

If the oscillator $O_v$ is suitably calibrated, the velocity $v$ can be obtained directly from the oscillator reading. Frequencies $F_2$ and $F_3$ which in this case are equal and coincide with $F_d$ can be indicated by the frequency indicator $Z_d$ which gives a direct reading of the distance $d$.

Fig. 12 shows a further modified form of apparatus for carrying out the method according to the invention. The frequency of the radiated oscillations can for instance follow the curve shown in Figure 6. The low-frequency voltage $e_s$ obtained by rectification is modulated in $M_1$ with the constant auxiliary frequency $F_h$ of oscillator $O_h$ so that a voltage $e_1$ consisting of frequencies $(F_s + F_h)$ results. By means of a further modulation with the variable auxiliary frequency $F'_d$ of the adjustable oscillator $O_d$ in modulator $M_2$ an intermediate voltage $e_2$ with the frequency $(F_s + F_h - F'_d)$ is obtained. The total displacement $(F_h - F'_d)$ of the beat frequency $F_s$ can thus be regulated by adjusting $O_d$. With a further modulator $M_3$ the modulation product of $e_2$ and the adjustable auxiliary frequency $F'_v$ of oscillator $O_v$ is obtained, this consisting of the sum and difference frequencies as follows:

$$F_3 = F_s + F_h - F'_d + F'_v$$
$$= F_d \pm F_v + F_h - F'_d \pm F'_v$$

With increasing transmitting frequency and increasing distance this voltage contains the components $$F'_3 = F_h + (F_d - F'_d) + (F_v - F'_v) \quad (10a)$$

With a decreasing distance, however, $F_3$ contains the components $$F''_3 = F_h + (F_d - F'_d) - (F_v - '_v) \quad (10b)$$

These two components are visible in the frequency spectrograph $K_1$ in the form of corresponding deflections. Generator $O_v$ is thus adjusted in such a manner that both deflections coincide, that is, so that $F'_3 = F''_3$. In this case $(F_v - F'_v) = 0$, that is auxiliary frequency $F'_v$ adjusted by means of $O_v$ coincides with the beat part $F_v$ which is proportional to the velocity. The velocity can thus be read directly on the oscillator $O_v$ if the latter is suitably calibrated. After this adjustment the reading of the coinciding frequencies $F'_3$ and $F''_3$ in the frequency spectrograph is brought into the middle of the scale by altering the auxiliary frequency $F'_d$ of the oscillator $O_d$. This setting corresponds to the frequency $F_h$ of the oscillator $O_h$. Accordingly, $(F_d - F'_d) = 0$, that is, the auxiliary frequency $F'_d$ coincides with the part of the beat $F_d$ which is proportional to the distance. By suitably calibrating the oscillator $O_d$ it is thus possible to obtain a direct reading of the distance.

In order to obtain a more accurate adjustment of the measurement, a second frequency indicator $K_2$ can be provided by means of which small deviations from $F_h$ can be clearly seen. This frequency indicator can be a frequency spectrograph with a smaller spacing between the frequency stages or a frequency discriminator which indicates deviations from the prescribed frequency both as regards magnitude and sign. Such discriminators, which can for instance consist of two coupled oscillation circuits with phase comparison between the input and output voltage or comprise two mutually detuned oscillation circuits with an amplitude comparison of both output voltages, possess the particular advantage that static disturbing voltages such as for instance amplifier noises do not cause a permanent deflection, because the disturbing frequencies lie both above and below the prescribed frequency and on the average their effects neutralize each other. Small differences between the alternately occurring frequencies $F'_3$ and $F''_3$ can furthermore be determined by rectifying in G and indicating the beat in $Z_0$. Networks $N_1$, $N_2$ are provided with unequal transit times so as to make the alternately successively occurring frequencies coincide in time. In practice the average frequency of $K_1$ and $K_2$, respectively, may differ from the auxiliary frequency $F_h$ of oscillator $O_h$. In this case, also the auxiliary frequency $F'_d$ after adjustment to the middle of the scale deviates by a corresponding amount from the frequency $F_d$ which is proportional to the distance, a fact which can readily be taken into account when calibrating the oscillator $O_d$.

A similar advantageous arrangement is shown in Figure 13. In the latter, the output of modulator $M_4$ supplies a frequency $$F_4 = F_s + F_h$$

In modulators $M_5$, $M_6$ the difference frequencies are formed with the auxiliary oscillations $F'_s$ and $F''_s$ of oscillators $O'_s$ and $O''_s$ respectively. Frequencies $F_5$ and $F_6$ then contain the following components:

$$F'_5 = F_h + F_d + (F_v - F'_s) \quad (11a)$$
$$F''_6 = F_h + F_d + (-F_v - F''_s) \quad (11b)$$

Both these components are made to coincide by adjusting the oscillators $O'_s$, $O''_s$. Hence:

$$F_v - F'_s = -F_v - F''_s$$

that is $$F_v = \tfrac{1}{2}(F'_s - F''_s) \quad (12)$$

The deflections of $K_5$ and $K_6$ are then brought to the midpoint by means of a further simultaneous adjustment of $O'_s$, $O''_s$, this stop corresponding to a frequency $F_k$. Hence:

$$F'_5 = F_h + F_d + F_v - F'_s = F_k$$
$$F''_6 = F_h + F_d - F_v - F''_s = F_k$$

From this the sum and difference of $F'_5$ and $F''_6$ is obtained:

$$F_d = (F_k - F_h) + \tfrac{1}{2}(F'_s + F''_s) \quad (13)$$
$$F_v = \tfrac{1}{2}(F'_s - F''_s)$$

With a suitable calibration, it is thus possible to obtain a direct reading of the distance $d$ from the sum of the settings of the oscillators $O'_s$, $O''_s$ and of the relative velocity $v$ from the difference of these settings. To facilitate the reading, two scales may be provided which are connected with the adjusting elements of the oscillators by means of gears which form the sum and difference values. These scales give a direct reading of the sum and difference of both settings and thus enable the distance and relative velocity to be determined directly. For $F_k = F_h$ the expression $F_d$ is simplified according to (13) as follows:

$$F_d = \tfrac{1}{2}(F'_s + F''_s)$$

To enable the required average frequency $F_k$ to be more accurately indicated, discriminators $D_5$, $D_6$ may be provided together with meters $Z_5$, $Z_6$ which indicate small deviations in magnitude and sign from the required frequency $F_k$.

With the arrangements described it is easily possible to automatically adjust the auxiliary oscillators to correspond to the variable distance and velocity. The discriminator output voltage $D_5$ can for instance serve for the automatic adjustment of the oscillator $O'_s$, so that this oscillator can be continuously controlled so as to maintain the frequency $F_k$ constant. It is also possible in a similar manner to readjust automatically oscillator $O''_s$ in dependence on the output voltage of $D_6$.

Auxiliary oscillators $O_h$ in Figures 12 and 13 can also be constructed so as to be capable of being switched over in steps in order to change the distance range.

The distance determined by measuring the beat frequency depends on the frequency wobbling velocity and the range within which the frequency of transmitter S is varied. As a result of alterations in the wobbling speed or frequency range, measuring errors may occur. It is therefore advisable to check the system by connecting the calibrating line L having a known transit time between the transmitter S and the receiver E (see Figure 13). The transmitter wobble is then so adjusted that with this control the distance indication actually corresponds to the transit time of line L.

Various other modified forms of the invention are possible in practice when technical means which are known per se are employed.

The frequency of the electrical oscillations employed is generally higher than 100 mc., the most favourable frequency to be selected in each case depending on the size and shape of the reflecting object.

I claim:

1. In a method of determining the distance between a first and a second point moving relatively with respect to each other, the steps of transmitting from the first point to the second point a pair of radiant energy portions one of which has a constant frequency and the other having a frequency varying periodically as a predetermined function of time, combining at said first point components of the respective energy portions received both directly and indirectly by way of reflection from said second point, to produce beat energies having frequencies varying, respectively, in proportion to the relative speed between said points and in proportion to the combined relative speed and distance between said points, and combining said beat energies to derive a single output current of amplitude proportional to the absolute momentary distance between said points.

2. In a method of determining the distance between a first and a second point moving relatively with respect to each other, the steps of transmitting from the first to the second point a pair of radiant energy portions one of which has a constant frequency and the other having a frequency varying periodically as a predetermined function of time, combining at said first point components of the respective energy portions received both directly and indirectly by way of reflection from said second point, to produce a pair of beat energies having frequencies varying, respectively, in proportion to the relative speed between said points and in proportion to the combined relative speed and distance between said points, converting said beat energies into output energies having amplitudes proportional to the respective beat frequencies, and combining said output energies to produce a single output current of amplitude proportional to the absolute momentary distance between said points.

3. In a method of determining the distance between a first and a second point moving relatively with respect to each other, the steps of transmitting from the first point to the second point a pair of radiant energy portions one of which has a constant frequency and the other having a frequency varying periodically as a predetermined function of time, combining at said first point components of the respective energy portions received both directly and indirectly by way of reflection from said second point, to produce beat energies having frequencies varying, respectively, in proportion to the relative speed between said points and in proportion to the combined relative speed and distance between said points, intermodulating said beat energies to produce output energy of a frequency varying in proportion to the absolute momentary distance between said points, and converting said output energy of varying frequency into a current of proportionate amplitude variation.

4. In a method of determining the distance between a first and a second point moving relatively with respect to each other, the steps of transmitting from the first to the second point a pair of radiant energy portions one of which has a constant frequency and the other having a frequency varying periodically as a linear function of time according to a predetermined saw-tooth wave, combining at said first point components of the respective energy portions received both directly and indirectly by way of reflection from said second point, to produce a pair of beat energies having frequencies varying, respectively, in proportion to the relative speed between said points and in proportion to the combined relative speed and distance between said points, converting said beat energies into output energies having amplitudes proportional to the respective beat frequencies, and combining said output energy to produce a single current of amplitude proportional to the absolute momentary distance between said points.

5. In a method of determining the distance between a first and a second point moving relatively with respect to each other, the steps of simultaneously transmitting from the first to the second point separate radiant energy portions one of which has a constant frequency and the other having a frequency varying periodically as a function of time according to a predetermined lower frequency wave, combining at said first point components of the respective energy portions received both directly and indirectly by way of reflection from said second point, to produce a pair of beat energies having frequencies varying, respectively, in proportion to the relative speed between said points and in proportion to the combined relative speed and distance between said points, converting the frequency of said beat energies into output currents of proportionately varying amplitude, and combining said output currents to derive a single current of amplitude proportional to the absolute momentary distance between said points.

6. In a method of determining the distance between a first and a second point moving relatively with respect to each other, the steps of simultaneously transmitting from the first to the second point separate radiant energy portions one of which has a constant frequency and the other having a frequency varying periodically according to a substantially linear saw-tooth wave, combining at said first point components of the respective energy portions received both directly and indirectly by way of reflection from said second point, to produce a pair of beat energies having frequencies varying, respectively, in proportion to the relative speed between said points and in proportion to the combined relative speed and distance between said points, converting the frequency of said beat energies into output currents of proportionately varying amplitude, and combining said output currents to derive a single current of amplitude proportional to the absolute momentary distance between said points.

7. In a system for determining the distance between a first and a second point moving relatively with respect to each other, means for transmitting from said first point a pair of radiant energy portions one of which has a constant frequency and the other having a frequency varying periodically as a predetermined function of time, receiving means at said first point for combining components of the respective energy portions received from said transmitting means both directly and indirectly by way of reflection from said second point, to produce a pair of beat energies having frequencies varying, respectively, in proportion to the relative speed between said points and in proportion to the combined relative speed and distance between said points, means for converting said beat energies into output energies having amplitudes varying in proportion to the respective beat frequencies, means for combining said output energies to derive a single output current of amplitude proportional to the absolute momentary distance between said points, and a translating means energized by said output current.

8. In a system for determining the distance between a first and a second point moving relatively with respect to each other, means for transmitting from said first point a pair of radiant energy portions one of which has a constant frequency and the other having a frequency varying periodically as a predetermined function of time, receiving means at said first point for combining components of the respective energy portions received from said transmitting means both directly and indirectly by way of reflection from said second point, to produce a pair of beat energies having frequencies varying, respectively, in proportion to the relative speed between said points and in proportion to the combined relative speed and distance between said points, a modulator for combining said beat energies to produce output energy of frequency varying in proportion to the absolute momentary distance between said points, means for converting the frequency of said output energy into a current of proportional variation, and a translating means energized by said output current.

9. In a system for determining the distance between a first and a second point moving relatively with respect to each other, means for simultaneously transmitting from said first point to said second point radiant energy portions one of which has a constant frequency and the other having a frequency varying periodically as a linear function of time, receiving means at said first point for combining components of said energy portions received from the respective transmitting means both directly and indirectly by way of reflection from said second point, to produce a pair of beat energies having frequencies varying, respectively, in proportion to the relative speed between said points and in proportion to the combined relative speed and distance betwen said points, discriminator means for converting the frequency variations of said beat energies into output energies of proportional amplitudes, means for combining said output energies to produce a single output current of amplitude proportional to the absolute momentary distance between said points, and a translating means energized by said output current.

10. In a system for determining the distance between a first and a second point moving relatively with respect to each other, means for simultaneously transmitting from said first point to said second point radiant energy portions one of which has a constant frequency and the other having a frequency varying periodically as a linear function of time, receiving means at said first point for combining components of said energy portions received from the respective transmitting means both directly and indirectly by way of reflection from said second point, to produce a pair of beat energies having frequencies varying, respectively, in proportion to the relative speed between said points and in proportion to the combined relative speed and distance between said points, a modulator for combining said beat energies to derive output energy of frequency varying in proportion to the absolute momentary distance between said points, discriminator means for converting the frequency variations of said output energy into an output current of proportionate amplitude, and a translating means energized by said output current.

11. In a system for determining the distance between a first and a second point moving relatively with respect to each other, means for alternately and successively transmitting from said first point to said second point radiant energy portions one of which has a constant frequency and the other having a frequency varying according to a predetermined function of time, receiving means at said first point for combining components of the radiated energies received from said transmitting means both directly and indirectly by way of reflection from said second point, to produce successively occurring beat energies having frequencies varying, respectively, in proportion to the relative speed between said points and in proportion to the combined relative speed and distance between said points, means for relatively time-delaying said beat energies and for combining the delayed energies into single output energy of frequency varying according to the absolute momentary distance between said points, means for converting the frequency of said output energy into an output current of corresponding amplitude change, and a translating means energized by said output current.

12. In a system for determining the distance between a first and a second point moving relatively with respect to each other, means for alternately and successively transmitting from said first to said second point radiant energy portions one of which has a constant frequency and the other having a frequency varying periodically according to a substantially linear saw-tooth wave, receiving means at said first point for combining components of the radiated energies received from said transmitting means both directly and indirectly by way of reflection from said second point, to produce a pair of successively occurring beat energies having frequencies varying, respectively, in proportion to the relative speed between said points and in proportion to the combined relative speed and distance between said points, and spectrographic frequency analyzing means for simultaneously indicating the frequencies of both said beat energies.

GUSTAV GUANELLA.

REFERENCES CITED

The following references are of record in the file of this patent:

UNITED STATES PATENTS

| Number | Name | Date |
|---|---|---|
| 1,495,616 | Simpson | May 27, 1924 |
| 1,945,952 | Nicolson | Feb. 6, 1934 |
| 2,134,716 | Gunn | Nov. 1, 1938 |
| 2,193,361 | Rice | Mar. 12, 1940 |
| 2,301,929 | Budenbom | Nov. 17, 1942 |
| 2,408,742 | Eaton | Oct. 8, 1946 |
| 2,427,219 | Luck | Sept. 7, 1947 |

FOREIGN PATENTS

| Number | Country | Date |
|---|---|---|
| 497,147 | Great Britain | Dec. 9, 1938 |